United States Patent [19]

Weir et al.

[11] Patent Number: 4,594,102
[45] Date of Patent: Jun. 10, 1986

[54] RECOVERY OF COBALT AND NICKEL FROM SULPHIDIC MATERIAL

[75] Inventors: Donald R. Weir; Derek E. Kerfoot, both of Fort Saskatchewan; Michael E. Chalkley, St. Albert, all of Canada

[73] Assignee: Sherritt Gordon Mines Limited, Toronto, Canada

[21] Appl. No.: 532,331

[22] Filed: Sep. 15, 1983

[30] Foreign Application Priority Data

Mar. 29, 1983 [CA] Canada ................................ 424733

[51] Int. Cl.⁴ ............................................ C22B 23/00
[52] U.S. Cl. .................................... 75/119; 75/101 R; 75/108; 75/115; 75/117; 75/120; 75/121; 423/36; 423/45; 423/52; 423/104; 423/106; 423/109; 423/141; 423/146; 423/150; 204/108
[58] Field of Search ............... 423/106, 104, 109, 146, 423/150, 36, 45, 141, 140, 52; 75/101 R, 108, 115, 117, 119, 120, 121; 204/108

[56] References Cited

U.S. PATENT DOCUMENTS

| | | | |
|---|---|---|---|
| 2,020,313 | 11/1935 | Holstein et al. | 423/106 |
| 2,755,172 | 7/1956 | McGauley et al. | 423/43 |
| 3,168,375 | 2/1965 | Barut et al. | 423/106 |
| 3,493,365 | 2/1970 | Pickering et al. | 423/106 |
| 4,338,200 | 7/1982 | Zeijlstra | 423/104 |
| 4,440,569 | 4/1984 | Weir et al. | 423/106 |
| 4,443,253 | 4/1984 | Weir et al. | 75/120 |

FOREIGN PATENT DOCUMENTS 635269  1/1962  Canada .

Primary Examiner—John Doll
Assistant Examiner—Robert L. Stoll
Attorney, Agent, or Firm—Robert F. Delbridge; Arne I. Fors

[57] ABSTRACT

A process for recovering cobalt and nickel values from cobalt and nickel containing sulphidic material also containing iron includes roasting the sulphidic material to produce a calcine containing water soluble cobalt and nickel sulphate, and leaching the calcine in aqueous sulphate solution under oxidizing conditions at an oxygen overpressure in the range of from about 50 kPa to about 1500 kPa and at a temperature in the range of from about 100° to about 180° C. to produce an iron-containing residue and a cobalt and nickel containing solution. The residue is separated from the solution, and cobalt and nickel values are recovered from the solution.

6 Claims, 1 Drawing Figure

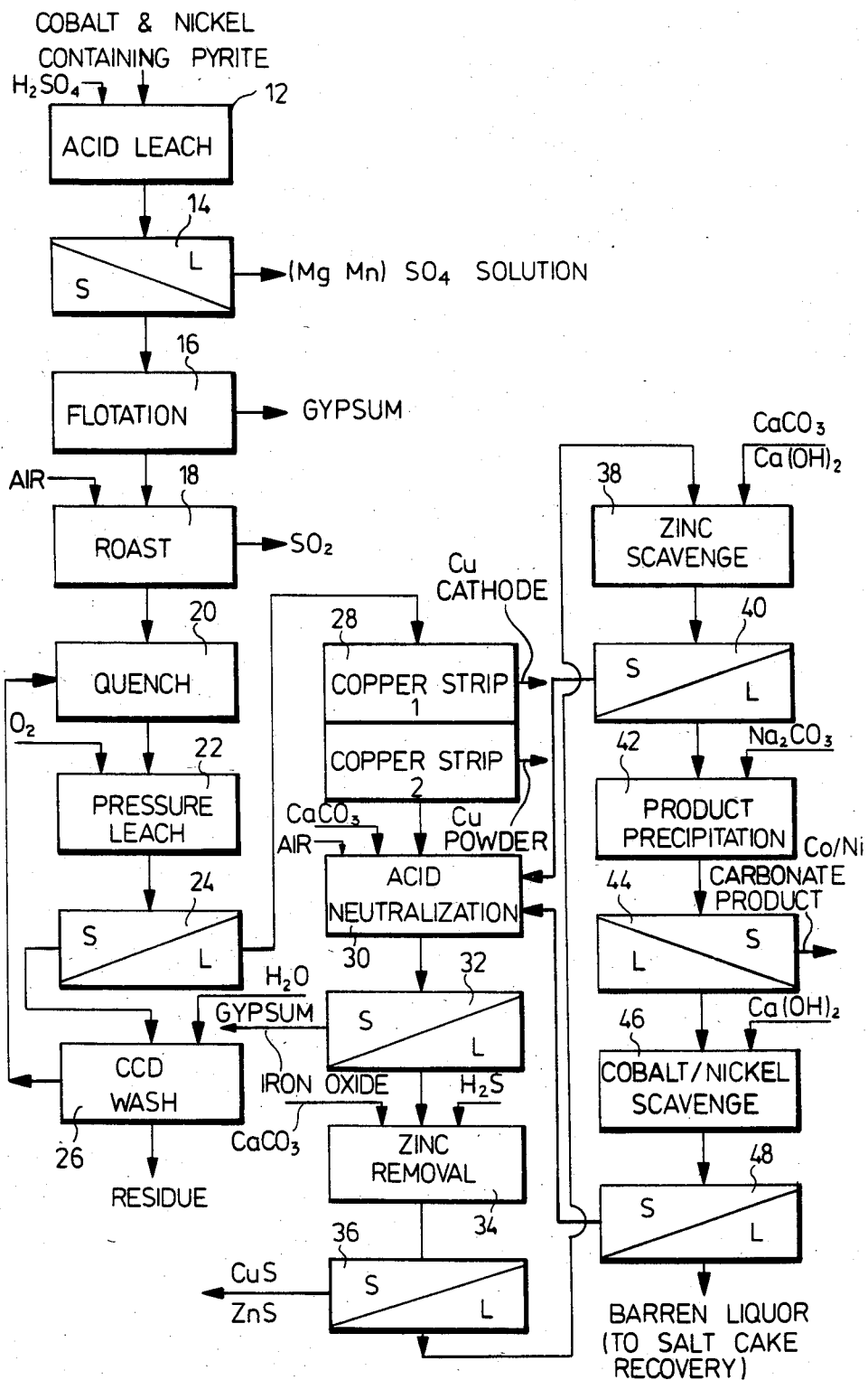

RECOVERY OF COBALT AND NICKEL FROM SULPHIDIC MATERIAL

This invention relates to the recovery of cobalt and nickel values from cobalt and nickel containing sulphidic material which also contains iron. Such sulphidic material may be a low grade pyritic ore or concentrate containing other base metals such as copper, lead, zinc, manganese and aluminum.

In one known cobalt recovery process, flotation concentrate of the ore is roasted in a fluosolids roasting furnace to form water soluble sulphates of cobalt and copper and to convert the iron content to a water insoluble oxide. The resultant calcine is leached in water so as to dissolve the cobalt and copper sulphates. Copper is recovered selectively from the resultant solution by electrowinning and, after purification and concentration of the solution, cobalt is also recovered by electrowinning. However, this process is not suitable for treatment of ores also containing economic levels of nickel as well as cobalt.

In a known nickel recovery process, the ore or concentrate is sulphation roasted in the presence of sodium sulphate in a fluosolids roaster, and the resultant calcine is leached in aqueous solution so as to dissolve nickel sulphate, leaving the iron in the insoluble residue. In the absence of sodium sulphate, conversion of nickel sulphide to the water soluble sulphate is slow, and nickel extraction in the subsequent leach is low. The sulphur content of the ore or concentrate in excess of that required for sulphation of metal values reports as sulphur dioxide in the roaster off-gas at a concentration suitable for the production of sulphuric acid, which often forms a marketable by-product of the process.

Attempts have been made to use such processes in the treatment of sulphidic ores containing both cobalt and nickel. However, nickel recovery is usually low, even when sodium sulphate is added during roasting, since roasting conditions are set for optimum sulphation of cobalt which has a higher economic value. The thermal stability ranges of cobalt and nickel sulphate do not coincide so that, when the roast is carried out at the optimum temperature for cobalt sulphation, a significant amount of water and acid insoluble nickel ferrite is formed, with resulting low solubility of nickel in the subsequent leach operation.

Also, sodium sulphate added during roasting reports to the leach solution, thereby limiting process options during cobalt and nickel recovery therefrom, and ultimately leading to a disposal problem since sodium sulphate must be removed from the barren solution before discharge to the environment.

It is also known to leach cobalt and nickel containing sulphidic material under oxidizing conditions at elevated temperatures of about 230° C. and pressures of about 5 MPa to oxidize the sulphide content directly to soluble sulphate. However, in this process, the leach solution contains all the sulphuric acid generated by oxidation of the sulphides in addition to the cobalt and nickel sulphates. Recovery of the metal values from such a solution can only be achieved after neutralization of the acid, with the result that recovery of the acid in a marketable form is not economically feasible. Such a leach has to be carried out under severely corrosive conditions of high acidity and high temperature.

It is therefore an object of the invention to provide an improved process for the recovery of cobalt and nickel values from cobalt and nickel containing sulphidic material.

The present invention is based on a discovery that acceptable recoveries of cobalt and nickel values can be obtained from cobalt and nickel containing sulphidic material which also contain iron by roasting (which may be sulphation roasting) the material to produce a calcine containing water soluble cobalt and nickel sulphates, and leaching the calcine in aqueous sulphate solution at an oxygen overpressure in the range of from about 50 to about 1500 kPa at a temperature in the range of from about 100° to about 180° C. to produce a cobalt and nickel containing solution from which the cobalt and nickel values can be recovered. It has also been found that in such a process the precipitation of iron from solution during the leach is enhanced, thereby simplifying subsequent solution purification operations.

Bearing in mind that the teaching of the prior art is to treat such material by sulphation roasting which results in the oxidation of a significant fraction of the nickel sulphide to the water and dilute acid insoluble nickel ferrite ($NiFe_2O_4$) rather than to the desired water soluble sulphate, it is surprising that the application of an oxidative pressure leach to the treatment of the sulphation roasted calcine should increase the recovery of nickel. While it is well known that oxidative pressure leaching will convert nickel sulphide to the water soluble sulphate, it was not previously appreciated that the pressure leach treatment would extract the refractory oxidized nickel contained in ferrite phases. Further, it is surprising that nickel is dissolved selectively from the ferrite phase in the pressure leach, with no net dissolution of the iron.

In summary, therefore, the oxidative pressure leach treatment of a sulphation roasted calcine has the added capability to extract residual nickel present as both the sulphide and ferrite forms, which were not recoverable in the atmospheric water leach of the prior art.

In consequence of the more effective extraction of metal values from the calcine provided by the pressure leach in accordance with the present invention, the roaster may be operated over a wider range of conditions, without significantly reducing the overall cobalt and nickel recovery. For example, it is desirable to minimize the amount of sulphur trioxide which is formed by the reaction of sulphur dioxide with excess oxygen during roasting, since the sulphur trioxide must be removed from the sulphir dioxide stream, for example by scrubbing in water, to render it suitable as a feed to a conventional sulphuric acid plant. The sulphur trioxide thus formed represents a loss of potential marketable sulphuric acid production, as well as generating a waste stream requiring additional treatment. The amount of sulphur trioxide formed can be reduced by limiting the amount of oxygen available during roasting or by increasing the roasting temperature. However, both these changes would result in a decrease in the recovery of cobalt and nickel in the prior art processes; the former by leaving residual sulphides in the calcine, and the latter by increasing the formation of nickel ferrite, and could not therefore be adopted advantageously.

Thus, the combination of the roast with the oxidative pressure leach in accordance with the invention provides enhanced recovery not only of cobalt and nickel but also of sulphuric acid from a sulphidic material of the kind referred to.

Some cobalt and nickel containing sulphidic ore also contains manganese which, if present in the material after a sulphation roast and pressure leach in accordance with the present invention, will contaminate the solution thereby necessitating additional solution purification. In accordance with a further feature of the invention, it has been discovered that manganese can be selectively removed from the sulphidic material by leaching in dulute sulphuric acid solution to a terminal pH of from about 1.5 to about 2 prior to sulphation roasting. Manganese unexpectedly dissolves, together with magnesium if present, with the result that manganese and magnesium are effectively removed from the material.

If the cobalt and nickel containing sulphidic material also contains copper, with the result that the cobalt and nickel containing solution also contains dissolved copper, the process may also include removing copper from the cobalt and nickel containing solution by electrolysis before recovery of cobalt and nickel values therefrom.

If the cobalt and nickel containing material also contains zinc, with the result that zinc is present in the cobalt and nickel containing solution, the process may also include removing the zinc in a two-stage zinc removal step including adding a sulphidizing agent to the solution at a pH of from about 3 to about 5 to precipitate a substantial amount of zinc values as zinc sulphide, separating the precipitated zinc sulphide from the solution and adjusting the pH of the solution in a second stage to a value of from about 6 to about 7 to precipitate substantially all the remaining zinc as a low grade hydroxide, and recycling the low grade hydroxide to a prior step in the process.

The recovery of cobalt and nickel values from the leach solution may be carried out in two stages including precipitating a substantial proportion of cobalt and nickel values in a first stage by adding a sub-stoichiometric amount of precipitating agent, separating the relatively pure precipitated cobalt and nickel values from the solution, and precipitating the remaining cobalt and nickel values in a second stage by adding a stoichiometric excess of a precipitating agent, and recycling the resultant low grade precipitate to a prior step in the process.

One embodiment of the invention will now be described with reference to the accompanying drawing which shows a flow sheet for a process for recovering cobalt, nickel and other metal values from cobalt and nickel containing pyritic concentrate.

The cobalt and nickel containing material treated in this embodiment is a sulphidic ore or concentrate containing from about 0.2 to about 10% cobalt, from about 0.2 to about 10% nickel, from about 7 to about 48% iron, from about 4 to about 50% sulphur, from about 0.1 to about 2% magnesium, from about 0.01 to about 0.5% manganese, from about 0.4 to about 5% calcium, from about 0.2 to about 16% copper, from about 0.01 to about 0.5% zinc, and from about 0.2 to about 20% lead. As indicated earlier, one aspect of the invention is based on the discovery that manganese values as well as magnesium values are present in such ore principally in dolomitic form, namely as carbonates.

Referring to the drawing, the sulphidic concentrate is leached in an acid leach 12 in dilute aqueous sulphuric acid solution at ambient temperature and atmospheric pressure to a terminal pH of 1.5 to 2 to dissolve the dolomitic magnesium and manganese as sulphates and to convert most of the calcium carbonate to insoluble calcium sulphate (gypsum). The magnesium and manganese sulphate containing solution is separated from the remaining solids in a separation step 14 and is discarded. The solids proceed to a flotation step 16 where an upgraded sulphidic concentrate is produced with rejection of gypsum which is discarded.

The upgraded sulphidic concentrate, now substantially free from magnesium and manganese, is roasted in a sulphation roast step 18. This roast step 18 is carried out in a fluosolids roasting furnace at a temperature in the range of from about 500° to about 800° C. with at least a stoichiometric supply of oxygen in air and with the optimal addition of an alkali sulphate such as sodium sulphate to convert cobalt, nickel, copper, lead and zinc sulphides to sulphates and to convert the iron sulphides to an insoluble iron oxide. This reaction produces a furnace off-gas which contains sulphur dioxide and lesser amounts of sulphur trioxide. The off-gas stream is passed through a cyclone system (not shown) for recovery of entrained particulates which are recycled to the roast step 18. The off-gas stream is then scrubbed with an aqueous solution to remove sulphur trioxide and residual particulates, and the cleaned gas stream containing sulphur dioxide, oxygen and nitrogen forms the feed to a conventional sulphuric acid plant.

The hot calcine discharged from the roast step 18 is passed to a quench step 20, either directly or after an optional cooling step, where the calcine is quenched in recycled wash liquid (from a wash step to be described later) in an agitated tank where cobalt, nickel, copper and zinc sulphates dissolve together with any residual ferrous sulphate. The quenched slurry is pumped to a pressure leach step 22, where the slurry is leached in a multi-compartment autoclave at a temperature of from about 150° to about 160° C. under an oxygen overpressure of about 140 to 350 kPa thereby dissolving residual cobalt, nickel, copper and zinc sulphides and ferrites and oxidizing dissolved ferrous iron and precipitating the resultant ferric iron as a hydrated oxide. Lead sulphate is substantially insoluble and thus reports to the residue. After a retention time of about 60 to 120 minutes, the slurry is discharged and passed to a separation step 24 where the leach solution is separated from the residue in a liquid/solids separation step 24, with the residue subsequently being washed in countercurrent decantation wash step 26. The washed residue is discarded, and the wash liquid is recycled to the quench step 20 and to the separation step 24.

The resultant leach solution may typically contain from about 5 to about 50 g/L cobalt, from about 1 to about 50 g/L nickel, from about 1 to about 80 g/L copper, and from about 10 to about 30 g/L sulphuric acid depending on the composition of the original sulphidic concentrate, with minor amounts of iron and zinc, usually less than about 1 g/L. The total cobalt plus nickel plus copper concentration should not be allowed to exceed 100 g/L otherwise crystallization of sulphates may occur.

The leach solution is passed to a two-stage copper electrolytic strip step 28 where solid copper is produced at the cathode in the first stage and copper powder is produced in the second stage. Alternatively, only copper powder may be produced in a single stage. The copper concentration in the leach solution is reduced to less than about 1 g/L while the sulphuric acid concentration is increased to a value in the range of from about 30 to about 140 g/L. The copper depleted solution is therefore then treated in acid neutralization step 30 with finely ground limestone (calcium carbonate) to raise the pH to about 2.5 to 4. At the same time, the solution may be sparged with air to oxidize residual ferrous iron and precipitate the resultant ferric iron by hydrolysis. The precipitate of gypsum (calcium sulphate) and hydrated iron oxides is filtered off in separation step 32 and discarded.

The resultant solution thus contains residual copper and zinc in addition to the cobalt and nickel. In accordance with a further feature of the invention, zinc is removed in a two-stage process. In the first stage, about 50 to 70% zinc is removed with substantially all the copper in a zinc removal step 34 in which the solution is treated with a metered amount of hydrogen sulphide and also with limestone to raise the pH from 4 to 5, thereby precipitating a major amount of zinc with only a minimum amount of cobalt and nickel. The zinc and copper sulphide precipitate is filtered off in separation step 36.

The solution then proceeds to the second zinc removal stage, namely a zinc scavenge step 38 where substantially all the remaining zinc is precipitated as a low grade hydroxide by adjusting the pH to about 6.5 by addition of limestone and lime. At this pH, a substantial amount of cobalt and nickel is also precipitated. The precipitate is therefore separated from the solution in separation step 40 and is recycled to the acid neutralization step 30.

Cobalt and nickel values are than recovered from the purified solution in two stages. The first stage is a product precipitation step 42 where cobalt and nickel values are precipitated as the basic carbonates by the addition of a somewhat sub-stoichiometric amount (about 95%) of soda ash (sodium carbonate) at a temperature of about 70° to 75° C. The product slurry proceeds to a separation step 44 where the cobalt/nickel carbonate product is separated from the remaining solution.

Since a minor amount of cobalt and nickel remains in solution, the remaining solution is treated in a second recovery stage which is a cobalt/nickel scavenge step 46 in which an excess of sodium carbonate or milk of lime (calcium hydroxide) is added at 70° C. to precipitate cobalt and nickel values as a low grade basic carbonate or hydroxide contaminated with impurities such as magnesium and calcium. The precipitated basic carbonate or hydroxide is separated from the solution in a separation step 48 and recycled to the acid neutralization step 30 to enable the cobalt and nickel to be recovered. The remaining barren liquor is subsequently evaporated to recover crystalline sodium sulphate (salt cake).

It will be appreciated that the above described embodiment is particularly useful when the cobalt and nickel containing sulphidic starting material also contains contaminating amounts of copper and zinc. If such contaminants are not present, then the pressure leach solution from the separation step 24 may be treated directly for the recovery of cobalt and nickel values. When an appreciable amount of copper is present but the zinc content is sufficiently low in the starting material, then the neutralized solution from the separation step 32 may be directly treated for the recovery of cobalt and nickel values.

If the acid leach step 12 is not used, manganese in solution may be removed after the copper strip step 28 by passing ozone through the solution to precipitate manganese as manganese dioxide, which can then be removed in an appropriate liquid/solids separation step.

EXAMPLE 1

Prior Art Use of a Sulphation Promoter in Sulphation Roasting

A cobaltiferous pyrite, containing 36.4% iron, 41.0% sulphur, 1.35% cobalt, 0.14% nickel and 0.39% copper was roasted in a stoichiometric excess of air in a fluosolids roaster at a bed temperature of 680° without the addition of a sulphation promoter. The resulting calcine was leached in water at 70° C. under atmospheric conditions to dissolve the metal sulphates. This treatment resulted in the extraction of 90% cobalt, 53% nickel and 74% copper.

A second sample of the same cobaltiferous pyrite was roasted under comparable conditions, but with the addition of 3% by weight of sodium sulphate to the pyrite feed to the roaster. Leaching of the resulting calcine in water extracted 92% of the cobalt, 71% of the nickel, and 83% of the copper. This example demonstrates the significant improvement in metal extraction achievable by the use of a sulphation promoter such as sodium sulphate.

EXAMPLE 2

Prior Art

A pyritic concentrate containing 38.3% iron, 46.6% sulphur, 1.6% cobalt, 2.2% nickel and 5.6% copper was roasted in a stoichiometric excess of air in a fluosolids roaster at a bed temperature of 650° C., with an addition of 3% by weight of sodium sulphate to the roaster feed. The calcines produced during two periods of operation were collected and blended separately to provide two homogeneous batches, designated Calcine A and Calcine B.

Samples of Calcine A and Calcine B were leached in 50 g/L sulphuric acid solution for 2 hours at 70° C. under atmospheric conditions, to dissolve the metal sulphates. This treatment resulted in the metal extractions shown in Table 1.

TABLE 1

|  | Metal Extraction, % | | |
|---|---|---|---|
|  | Co | Ni | Cu |
| Calcine A | 80 | 58 | 94 |
| Calcine B | 89 | 68 | 94 |

EXAMPLE 3

Invention

Samples of Calcines A and B, prepared in Example 2, were pressure leached for 2 hours in 10 g/L sulphuric acid at 150° C. under 140 kPa oxygen overpressure in a batch autoclave. The metal extractions achieved are shown in Table 2

TABLE 2

|  | Metal Extraction, % | | |
|---|---|---|---|
|  | Co | Ni | Cu |
| Calcine A | 90 | 86 | 94 |
| Calcine B | 93 | 89 | 95 |

This example demonstrates the increase in nickel and cobalt extractions from calcines roasted under variable conditions, by the method of the invention as compared with the prior art.

EXAMPLE 4

A continuous pressure leaching run of 160 hours duration was carried out in which Calcine B (Example 2) was treated at 160° C. under 350 kPa oxygen pressure with a nominal retention time in the autoclave of 60 minutes. The calcine was repulped with recycled liquor from the washing of the pressure leach residue, and fed continuously to the autoclave at a rate of 7.5 kg/h. Metal extractions were determined after the initial repulping of the dry calcine (which corresponded to the atmospheric quench or leach of the prior art) and after discharge of the slurry from the pressure leach autoclave. The mean extractions of metals to solution in this extended test run are shown in Table 3.

TABLE 3

|  | Metal Extraction, % | | |
|---|---|---|---|
|  | Co | Ni | Cu |
| After Repulp Leach (70°) | 89 | 68 | 94 |
| After Pressure Leach (160° C.) | 95 | 89 | 94 |

Cobalt, nickel, copper, total iron, ferrous iron, and free sulphuric acid levels in the solutions were determined, after the repulping operation, and after the pressure leach, and the mean values are shown in Table 4.

TABLE 4

|  | Solution, g/L | | | | | |
|---|---|---|---|---|---|---|
|  | Co | Ni | Cu | FeT | Fe$^{2+}$ | H$_2$SO$_4$ |
| Repulp Leach (70° C.) | 19 | 21 | 64 | 28 | 10 | 3 |
| Pressure Leach (160° C.) | 20 | 25 | 65 | 1.2 | 0.1 | 38 |

This example demonstrates both an increase in cobalt and nickel extraction, and the more efficient rejection of iron from the metal bearing leach solution, in the process of the invention as compared with the prior art.

EXAMPLE 5

This example demonstrates the application of the process of the invention to bulk concentrates containing high levels of copper and lead.

Samples of three different concentrates were sulphation roasted in a fluosolids roaster at 650° C. to yield calcines (C, D and E) with the compositions shown in Table 5.

TABLE 5

|  | Calcine | | |
|---|---|---|---|
|  | C | D | E |
| Cobalt | 1.4 | 1.2 | 3.3 |
| Copper | 8.0 | 7.0 | 12.6 |
| Iron | 17.5 | 15.1 | 17.1 |
| Lead | 11.6 | 8.5 | 7.3 |
| Nickel | 1.9 | 1.7 | 4.3 |
| Sulphur | 12.2 | 11.7 | 12.9 |

Each of these calcines was treated by the procedure of Example 4, by repulping in acidic solution under atmospheric conditions, and was continuously pressure leached at 150° C. under 350 kPa oxygen overpressure. The metal extractions before and after the pressure leach are shown in Table 6.

TABLE 6

|  | Calcine | Extraction, % | | |
|---|---|---|---|---|
|  |  | Co | Ni | Cu |
| After Repulp Leach (70° C.) | C | 92 | 72 | 96 |
|  | D | 93 | 79 | 91 |
|  | E | 93 | 57 | 96 |
| After Pressure Leach (150° C.) | C | 97 | 87 | 92 |
|  | D | 97 | 85 | 89 |
|  | E | 97 | 91 | 94 |

EXAMPLE 6

This example demonstrates the separation of manganese from cobalt and nickel, by an acid leach of the sulphidic concentrate prior to sulphation roasting.

6a. A pyritic concentrate containing 1.5% Co, 2.2% Ni, 8.3% Cu and 0.125% Mn (i.e. with a Co:Mn weight ratio of 12:1) was sulphation roasted and pressure leached according to the process of the invention. The pressure leach discharge solution contained 14.5 g/L cobalt and 1.1 g/L manganese (Co:Mn ratio of 13:1) indicating a quantitative extraction of manganese to the cobalt bearing leach solution.

6b. A second pyritic concentrate containing 2.1% Co, 3.3% Ni, 2.6% Cu, 5.1% Ca, 1.9% Mg and 0.10% Mn, was leached in dilute sulphuric acid at 50° C. to a terminal pH of 1.8. The leached concentrate was filtered from the leach liquor and washed with water. The leached concentrate analyzed 2.3% Co, 3.5% Ni, 2.8% Ca, 0.03% Mg and 0.005% Mn (Co:Mn ratio of 460:1). Less than 1% of the cobalt, nickel, ane copper content of the concentrate was dissolved in the acid leach.

6c. A pyritic concentrate which had been leached in dilute sulphuric acid and which contained 3.3% Co, 4.3% Ni, 12.6% Cu, 0.12% Mg and 0.005% Mn was sulphation roasted and pressure leached according to the process of the invention. The leach discharge solution contained 15 g/L Co, 18 g/L Ni, 61 G/L Cu and 0.02 g/L Mn (Co:Mn ratio 750:1).

EXAMPLE 7

This example demonstrates the purification of the leach solution produced by the sulphation roast-pressure leach treatment of a cobalt and nickel containing concentrate according to the process shown in the drawing.

The cobalt and nickel-bearing leach solution produced by the continuous pressure leaching of Calcine B, defined in Example 2, contained (after dilution with resdue with liquor): 10 g/L Co, 12 g/L Ni, 30 g/L Cu, 1 g/L Fe, 1 g/L Zn and 18 g/L H$_2$SO$_4$. Copper was selectively removed from the solution by direct electrowinning to a level of 0.9 g/L, to give a solution containing 65 g/L free sulphuric acid. The free acid and much of the remaining iron was meutralized by the addition of ground limestone to a terminal pH of 2.8. The gypsum and iron oxide precipitate was discarded.

The residual 0.9 g/L copper and about 50% of the zinc was precipitated by treatment of the neutralized solution with a metered amount of hydrogen sulphide at pH 4. The remaining iron and zinc were precipitated by the addition of ground limestone and milk of lime to raise the solution pH to 6.8.

The purified solution analyzed 10 g/L Co, 11 g/L Ni and less than 0.01 g/L Fe and Zn, and less than 0.001 g/L Cu.

Other examples and embodiments of the invention will be readily apparent to a person skilled in the art, the scope of the invention being defined in the following claims.

What we claim as new and desire to protect by Letters Patent of the United States is:

1. A process for recovering cobalt and nickel values from cobalt and nickel containing sulphidic material also containing iron and zinc comprising roasting the sulphidic material to produce a calcine containing water-soluble cobalt and nickel sulphate, leaching the calcine in aqueous sulphate solution under oxidizing conditions at an oxygen overpressure in the range of from about 50 kPa to about 1500 kPa and at a temperature in the range of from about 100° to about 180° C. to produce an iron-containing residue and a cobalt, nickel and zinc containing solution, separating the residue from the solution, removing zinc from the solution in a two-stage zinc removal step including adding a sulphidizing agent to the solution in a first stage at a pH of from about 3 to about 5 to precipitate about 50 to 70% of zinc values as zinc sulphide, separating the precipitated zinc sulphide from the solution, adjusting the pH of the solution in a second stage to a value of from about 6 to about 7 to precipitate substantially all the remaining zinc as a low grade hydroxide with consequent precipitation of nickel and cobalt values, separating the low grade hydroxide and precipitated nickel and cobalt values from the solution, recycling the low grade hydroxide and precipitated nickel and cobalt values to a prior step in the process to recover said precipitated nickel and cobalt values, and recovering cobalt and nickel values from the remaining solution.

2. A process according to claim 1 wherein the cobalt and nickel containing sulphidic material also contains manganese, and the process comprises leaching the cobalt and nickel containing sulphidic material prior to the roasting step in aqueous sulphuric acid solution to a terminal pH of from about 1.5 to about 2 to cause the dissolution of manganese values with production of a manganese-depleted cobalt and nickel containing sulphidic material and a manganese containing solution, separating the manganese-depleted cobalt and nickel containing sulphidic material from the manganese-containing solution, and subjecting the manganese-depleted cobalt and nickel containing sulphidic material to the roasting step.

3. A process according to claim 1 wherein the cobalt and nickel containing sulphidic material also contains copper and the cobalt and nickel containing solution consequently also contains dissolved copper, and the process comprises removing copper from the cobalt and nickel containing solution by electrolysis before recovery of cobalt and nickel values therefrom.

4. A process according to claim 1 comprising carrying out the recovery of cobalt and nickel values from said solution in a two-stage nickel and cobalt recovery step including precipitating cobalt and nickel values in a first stage by adding a sub-stoichiometric amount of precipitating agent, separating the precipitated cobalt and nickel values from the solution, and precipitating the remaining cobalt and nickel values in a second stage by adding a stoichiometric excess of a precipitating agent, and recycling the resultant low grade precipitate containing said remaining cobalt and nickel values to a prior step in the process to recover said remaining cobalt and nickel values.

5. A process according to claim 1 wherein the cobalt, nickel and zinc containing solution is neutralized in a neutralization step to a pH in the range of from about 2.5 to 4 prior to said two-stage zinc removal step, and said neutralization step is said prior step to which said low grade hydroxide and precipitated nickel and cobalt values are recycled.

6. A process according to claim 4 wherein the cobalt, nickel and zinc containing solution is neutralized in a neutralization step to a pH in the range of from about 2.5 to 4 prior to said two-stage zinc removal step, and said neutralization step is said prior step to which said low grade precipitate containing said remaining cobalt and nickel values is recycled.

* * * * *